Aug. 31, 1937.　　　J. D. MORGAN　　　2,091,558
PRECISION CRANKING APPARATUS
Original Filed Aug. 15, 1933
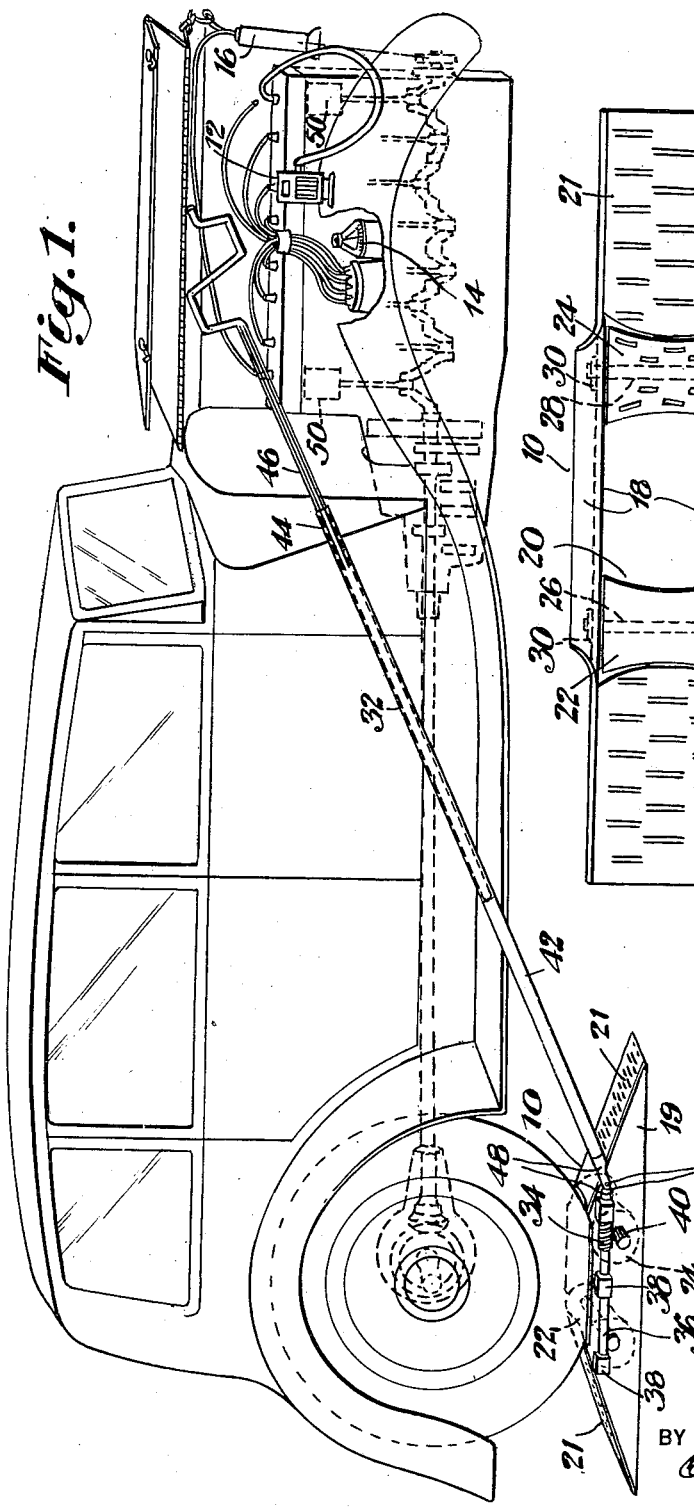
INVENTOR
JOHN D. MORGAN
BY
ATTORNEY Patented Aug. 31, 1937

2,091,558

UNITED STATES PATENT OFFICE 2,091,558

PRECISION CRANKING APPARATUS

John D. Morgan, South Orange, N. J., assignor to Power Patents Company, Jersey City, N. J., a corporation of Maine Original application August 15, 1933, Serial No. 685,219. Divided and this application December 24, 1934, Serial No. 758,935

2 Claims. (Cl. 74—14)

This invention relates to adjustment of the timing of an ignition system of an automotive internal combustion engine, and more particularly concerns improved precision cranking apparatus for automobiles. This application is a division of my copending application Serial No. 685,219, filed August 15, 1933 for Motor timing method and apparatus.

Correct ignition timing of an internal combustion engine is a factor of major importance in the attainment not only of maximum speed and power, but also of maximum economy and efficiency of operation. The factor of correct ignition timing is even more important than the factor of correct proportioning of the fuel and air supplied to the engine from the carbureter, as is shown by the fact that the engine is more sensitive to adjustments of ignition timing than it is to any other adjustment. With a properly timed ignition system almost any internal combustion engine, even one designed for operation at a high compression ratio, can be made to operate satisfactorily without spark knock when using ordinary straight run gasoline as fuel.

The primary object of the present invention is to provide improved method and means whereby even an unskilled operator may rapidly and accurately check and adjust the ignition timing of an automotive engine.

In checking the ignition timing of an automotive engine cylinder, a very important step is that of locating the top dead center position of the piston in the cylinder at the end of its compression stroke within an allowable tolerance of .001 of an inch of piston travel. This is because the ignition is timed with reference to the top dead center position of the piston. Moreover it is desirable to carry out the ignition timing operation rapidly and without removing the cylinder head or otherwise seriously disrupting the normal operating condition of the engine.

Methods and instruments heretofore developed for checking ignition timing and for locating the top dead center position of automotive engines are in general relatively complicated, inconvenient, time-consuming and inaccurate, particularly in the hands of an unskilled operator. One method heretofore employed for locating the top dead center position of an engine piston has been by inserting a wire or other displacement member into the ignition space of a cylinder through a priming cock or through an open spark plug socket, with the lower end of the wire resting on the top of the cylinder, and then hand cranking the engine until the wire is raised by the piston to its apparent highest point. This method is difficult in application and subject to considerable error because of uneven carbon deposit on the piston head, and because most modern engines are not fitted with priming cocks; and in many engines, as for example those of the L head type, spark plug sockets are offset to one side of the cylinder or are so relatively small as to make it difficult and sometimes impossible to use the ordinary type of displacement gauge for locating top dead center position.

Another method heretofore employed for ignition timing has involved hand cranking of the engine until the piston in a reference cylinder (usually No. 1 cylinder) is at the top dead center position of the compression stroke, as indicated by a mark such as "D. C. 1-4" placed by the manufacturer on the engine fly-wheel. Many modern automobiles, however, have no facilities for hand cranking and/or have inaccessible or unmarked fly-wheels.

Another object of the present invention is to provide mechanism whereby even an unskilled operator can quickly locate the top dead center position of a piston at the end of its compression stroke within a limit of accuracy under .001 of an inch of piston travel.

Another object of the present invention is to provide mechanism whereby even an unskilled operator can hand-crank any automobile engine in either direction with facility and without any of the difficulties usually encountered in hand cranking to the top dead center position of a piston on compression stroke.

With the above and other objects and features in view, the invention consists in the improved apparatus for cranking an automotive engine which is hereinafter described and more particularly defined in the accompanying claims.

In the following description of the invention, reference may be had to the accompanying drawing in which:

Fig. 1 is a view in perspective (somewhat diagrammatic) illustrating application of the invention to the adjustment of the ignition timing of an automotive engine of the straight eight Packard type.

Fig. 2 is a top plan view of the precision cranker shown under the right rear wheel of the automobile displayed in Fig. 1.

The preferred method of checking ignition timing according to the present invention contemplates positioning a precision cranker or rollator 10 under a rear drive wheel of the automobile under test. By employing a precision cranker of the type illustrated the operator can easily and smoothly hand-crank the engine forward and backward to the precise top dead center position of the piston on compression stroke. To inform the operator when the piston has reached top dead center position on compression stroke, the invention contemplates mounting a top dead center indicating pressure gauge 12 in operative communication with the ignition space of the engine cylinder under test and in full view of the operator as he turns the handle of the precision cranker. Gauge 12 is designed to show the operator when the piston has reached the top of its compression stroke within a limit of accuracy under one thousandth of an inch piston travel. A synchronizer or protractor 14 has its radial arm and quadrant scale attached respectively to the timing shaft and housing of the distributor element of the ignition system after the cap and rotor of the distributor have been removed. After locating top dead center position of the piston the operator sets the radial arm or indicator needle of the synchronizer at zero position on the quadrant scale, graduated in engine crank angle degrees. The operator then advances the piston of the cylinder under test to a predetermined optimum fixed advance firing position for slow engine speed by using the precision cranker and the quadrant scale and indicator needle of the synchronizer. The interrupter points of the distributor are then checked and adjusted for firing a fuel charge in the cylinder with the piston in this position and the spark lever, if any, fully advanced. After adjusting the fixed spark advance of the cylinder under test the operator can start the engine and check and adjust the operation of the centrifugal governor controlling the automatic spark advance for various engine speeds, by means of a stroboscope lamp 16 connected in the secondary ignition circuit, and oppositely disposed index marks respectively placed on the fan belt pulley and stationary engine casing to mark the fixed advance firing position of the cylinder under test, as hereinafter more fully explained.

As illustrated in Figs. 1 and 2, the principal elements of the precision cranker 10 include an open top box frame 18 having a rectangular horizontal base and spaced parallel side plates 19 between which is supported a roller cradle for a drive wheel of the automobile. The frame 18 is provided with end plates 21 which serve as ramp approaches up which an automobile drive wheel can be driven and thereby elevated onto cradle 20. The cradle 20 is formed by a pair of rollers 22 and 24 mounted in parallel spaced relation transversely of the frame 18 on horizontal shafts 26 and 28, respectively. Shafts 26 and 28 are journaled in bearings 30 formed in side plates 19 of frame 18. The spaces separating rollers 22 and 24 from each other and from the end plates of frame 18, and the length and diameter of the roller faces, are proportioned to provide a cradle to fit inflated pneumatic automobile wheel tires of all standard sizes. Roller 22 functions simply as an idler, while roller 24 is the driving element of the cranker 10 and is provided with a non-skid or friction tread surface to engage a wheel tire without slippage. The roller 24 may be rotated manually by the operator by means of linked members including an extension crank arm 32, a worm gear 34 mounted on a shaft 36 which is journaled in bearings 38 on the frame 18, and a pinion 40 keyed to an extension of shaft 28 with its teeth in meshed relation with worm gear 34. Ramp plates 21 are provided with non-skid or friction tread top surfaces and lie at an oblique angle preferably less than 30° to the base of frame 18, thereby permitting a tired automobile wheel to be driven onto the cradle formed by the rollers 22 and 24 without difficulty. The crank arm 32 comprises a tubular sleeve element 42 having a hollow socket 44 of hexagonal cross section at its free end; and an extension crank rod 46 of hexagonal cross section designed for loose journal fit in sleeve 42 and meshed fit with socket 44 as shown. The pivoted end of sleeve 42 is connected to worm shaft 36 by linked I-bolts 47 and threaded sleeve fittings 48.

To use the precision cranker a rear drive wheel of the car is driven onto the roller cradle and by turning the handle of crank arm 32 with the engine in gear and the ignition off, the operator cranks the engine through the rear axle, differential and drive shaft, thereby reciprocating the pistons 50 in the engine cylinders. Sufficient mechanical advantage is afforded by a speed reduction ratio of say 10:1 between the worm gear and pinion elements of the precision cranker, to enable the operator to easily crank the engine against the full compression resistance of all the cylinders. With rollers of approximately 4" in diameter supporting a tired automobile wheel of about 30" O. D., and with the automobile geared to a 4:1 speed ratio between the engine and drive wheel, the speed reduction ratio between the crank arm of the precision cranker and the engine is about 20:1. The precision cranker enables the operator to turn the engine smoothly in either direction to bring a piston to top dead center quickly without having to turn the engine over twice whenever the piston has over-run top dead center position while employing the ordinary hand crank attachment.

By employing the method and apparatus of the present invention it is possible for even an unskilled operator to effect a full, accurate and relatively rapid adjustment of the various elements concerned with the correct timing of the ignition circuit or circuits of an automotive internal combustion engine. The precision cranker can be operatively connected to the automotive engine ready for the test in the time required to throw the engine in gear and to drive the automobile onto the roller cradle. The precision cranker is adapted for use with all types of cars and is designed for use by an operator standing on either side of the car engine. The top dead center gauge is extremely simple in design and operation and requires no accessory parts other than adaptors to fit various sizes of spark plug openings. This gauge can be attached to the engine cylinder ready for test in the time required to remove the spark plug and insert the adaptor, and even an unskilled operator can very quickly turn the engine over by the precision cranker to the top dead center position of a piston on the compression stroke. The precision cranker and the top dead center gauge are designed so that the operator can stand in one position while locating the top dead center position of the piston and while checking the timing of the fixed spark advance and of the automatic spark advance by means of the synchronizer and by means of the stroboscopic lamp.

The invention having been thus described, what is claimed as new is:

1. Apparatus adapted for use in cranking an automobile engine comprising, a pair of cylindrical rollers having friction tread surfaces, mounted in parallel spaced horizontal relation on shafts journaled in bearings supported by parallel side plates of a box frame, end plates for said frame having friction tread top surfaces lying at an oblique angle with the horizontal and forming ramp approaches up which an automobile wheel can be driven to elevate it onto the crade formed by said rollers, and mechanism for rotating one of said rollers and a tired automobile wheel supported thereon comprising an extension crank arm adapted to extend to the vicinity of the engine and reduction gear mechanism connecting the same to one of said rollers whereby the engine of said automobile can be smoothly cranked in either direction through its rear axle by an operator stationed at a point adjacent the engine.

2. Apparatus adapted for use in cranking an automobile engine comprising, a pair of parallel spaced horizontally journaled rollers adapted to form a cradle for an automobile tired wheel, ramp plates for elevating a wheel onto said cradle, an extension crank arm adapted to extend to the vicinity of the engine and reduction gear mechanism connecting the same to one of said rollers whereby the engine of said automobile can be smoothly cranked in either direction through its rear axle by an operator stationed at a point adjacent the engine.

JOHN D. MORGAN.